United States Patent [19]
Schmidt

[11] 3,942,288
[45] Mar. 9, 1976

[54] SYSTEM FOR SHAPING AND FINISHING WOOD CHAIR SEATS

[75] Inventor: Erich Schmidt, Vienna, Austria

[73] Assignee: Maschinenfabrik Zuckermann Komm.Ges., Vienna, Austria

[22] Filed: June 26, 1973

[21] Appl. No.: 373,873

[30] Foreign Application Priority Data
June 27, 1972 Austria .................. 5528/72

[52] U.S. Cl. .................. 51/76 R; 51/101 R; 51/138
[51] Int. Cl.² .................. B24B 7/28; B24B 17/02
[58] Field of Search ...... 51/76 R, 74 R, 101 R, 137, 51/138, 139, 135 R

[56] References Cited
UNITED STATES PATENTS

| 2,248,191 | 7/1941 | Pratt | 51/139 |
|---|---|---|---|
| 2,486,819 | 11/1949 | Brown | 51/137 |
| 3,376,672 | 4/1968 | Schmidt | 51/101 R X |
| 3,611,647 | 10/1971 | Davis | 51/139 X |

Primary Examiner—Al Lawrence Smith
Assistant Examiner—Nicholas Godici
Attorney, Agent, or Firm—Karl F. Ross; Herbert Dubno

[57] ABSTRACT

A succession of wood workpieces is displaced by a conveyor past a plurality of finishing stations with the grain of the workpieces extending perpendicular to the transport direction. An abrasive surface of a finishing tool is displaced over the workpiece parallel to the grain direction at a peripheral speed equal to about 150 times the advance speed of the workpieces. These workpieces are wood chair seats formed with a surface depression and the abrasive surface is a sanding belt spanned over a vertically displaceable soft drum or cushion. The soft support for the sanding belt is displaced vertically by a cam arrangement to conform the path of travel of the sanding surface to the workpiece. The sanding region of one station is staggered transversely to the transport direction with respect to the other stations.

3 Claims, 7 Drawing Figures

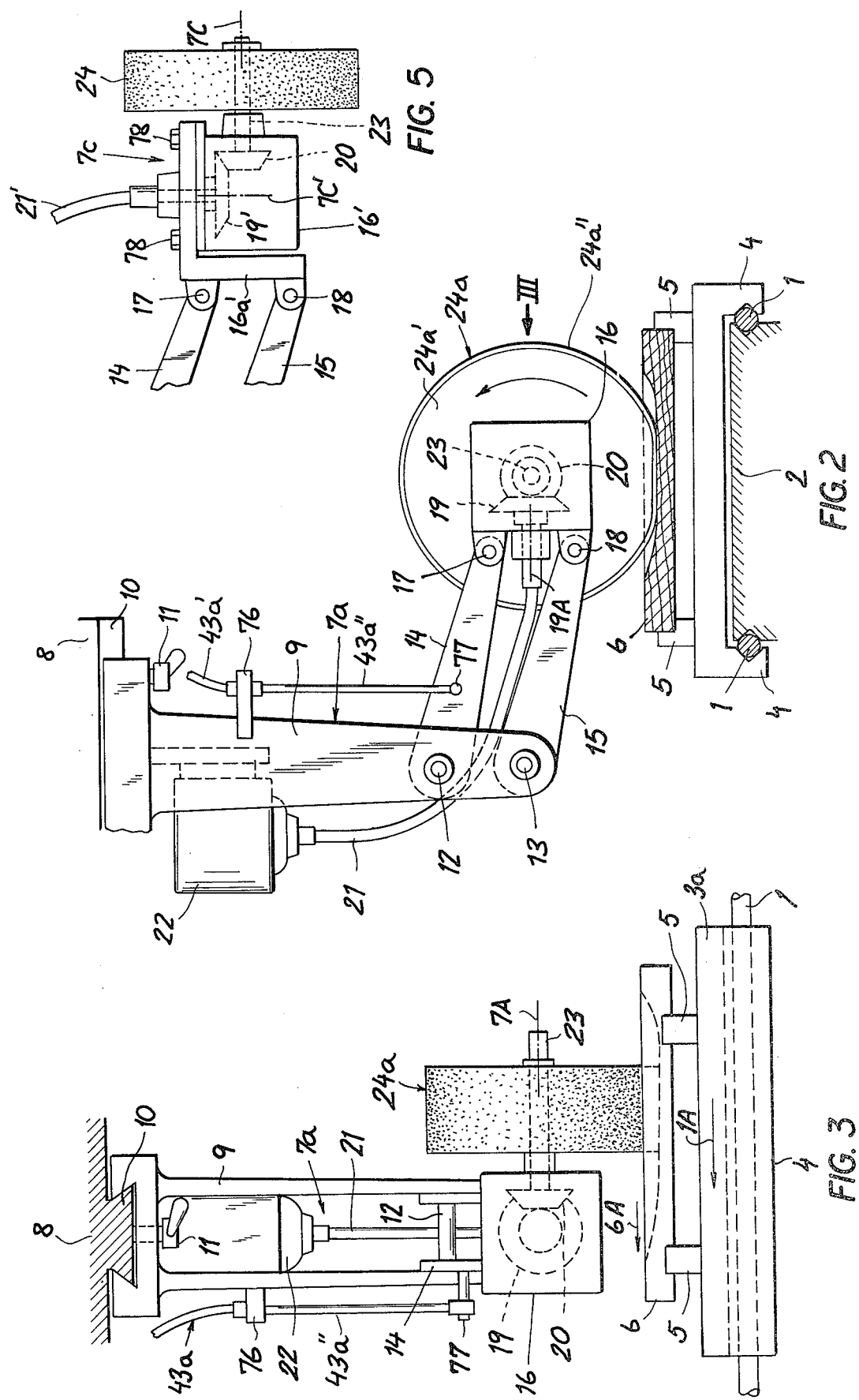

SYSTEM FOR SHAPING AND FINISHING WOOD CHAIR SEATS

CROSS REFERENCE TO RELATED APPLICATION

This application is related to my copending applications Ser. No. 274,318, Ser. No. 338,814, and Ser. No. 342,803 filed 24 July 1972, 7 Mar. 1973, and 19 Mar. 1973, respectively.

FIELD OF THE INVENTION

The present invention relates to a system for finishing a wood workpiece. More particularly this invention concerns a method of and apparatus for finishing a flat workpiece such as a chair seat.

BACKGROUND OF THE INVENTION

The most common method of finishing a wood workpiece is to pass a series of such workpieces at a uniform speed along a transport path past a series of work stations. The workpieces are arrayed with their grain parallel to the transport direction and finished by tools having abrasive surfaces which move in a direction parallel to the transport direction. In this manner the scratches made by even the finest abrasive are hidden in the grain.

Such an arrangement does not, however, function well when the workpiece to be finished is flat and formed with surface hollows or pockets, such as chair seats. In this type of workpiece holidays are left with no finishing, and other spots are sanded to the point where some contours are eliminated.

It is known in this type of machine to guide the individual tools with respective cams so as to cut patterns into the workpiece. Often parts of the shape to be formed must be cut with a tool rotating on one direction while other regions must be cut with a tool that turns in the opposite direction so that splintering is avoided on the edge of a cut. This method of working requires a duplication of finishing tools that is inherently expensive.

OBJECTS OF THE INVENTION

It is therefore an object of the invention to provide an improved system for shaping and/or finishing a wood workpiece.

Another object is the provision of an improved method of and apparatus for finishing a flat workpiece such as a chair seat.

A further object is to provide such a system which produces a very smooth product with a minimum of complicated equipment.

SUMMARY OF THE INVENTION

These objects are attained according to the present invention in a system wherein the flat workpieces are advanced one after the other in a transport direction past at least one finishing station. The workpieces are clamped on the conveyor with their grain running substantially perpendicular to the direction of transport, and the finishing tool is driven such that its abrasive is displaced where it engages the workpiece in a direction substantially parallel to the grain direction. The speed of the abrasive on the surface of the tool is at least 100 times greater than the speed of advance of the workpiece, advantageously about 150 times faster.

In this manner the scratches left by the abrasive are almost invisible, as they are in line with the grain of the workpieces. With the 1:150 ratio between workpiece advance speed and tool peripheral speed the abrasive marks will be at most 0.5° out of line with the direction of advance. According to a further feature of the invention, I cant the grain of the workpiece or the abrading direction to this extent to compensate for this slight misalignment.

According to another feature of this invention the abrasive surface of the tool is a sandpaper belt spanned either over an air-filled wheel or over a soft cushion. This wheel or cushion is urged into contact with the workpiece by a cam-controlled programmer which is set to cut a predetermined shape into the workpiece with the tool or tools that work them. In both cases the sandpaper is urged against the workpiece by a vertically displaceable element controlled by a particular cam or the like.

DESCRIPTION OF THE DRAWING

The above and other objects, features, and advantages will become more readily apparent from the following description reference being made to the accompanying drawing in which:

FIG. 2 is a section taken along line II—II of FIG. 1 in enlarged scale;

FIG. 3 is a view taken in the direction of arrow III of FIG. 2.

FIGS. 4 and 5, respectively, are views taken in the directions of arrows IV and V of FIG. 1;

FIG. 6 is an end view of an alternative type of finishing device; and

FIG. 7 is a section taken along line VII—VII of FIG. 6.

SPECIFIC DESCRIPTION

Figure 4:
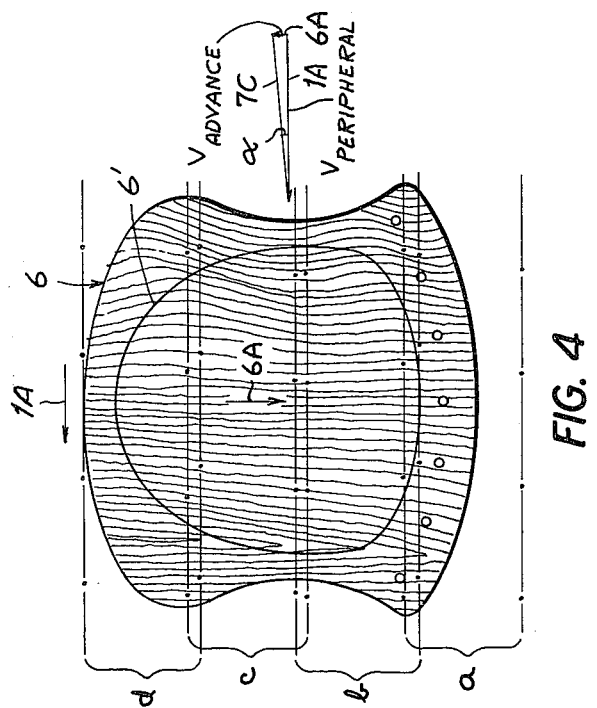
Figure 1:
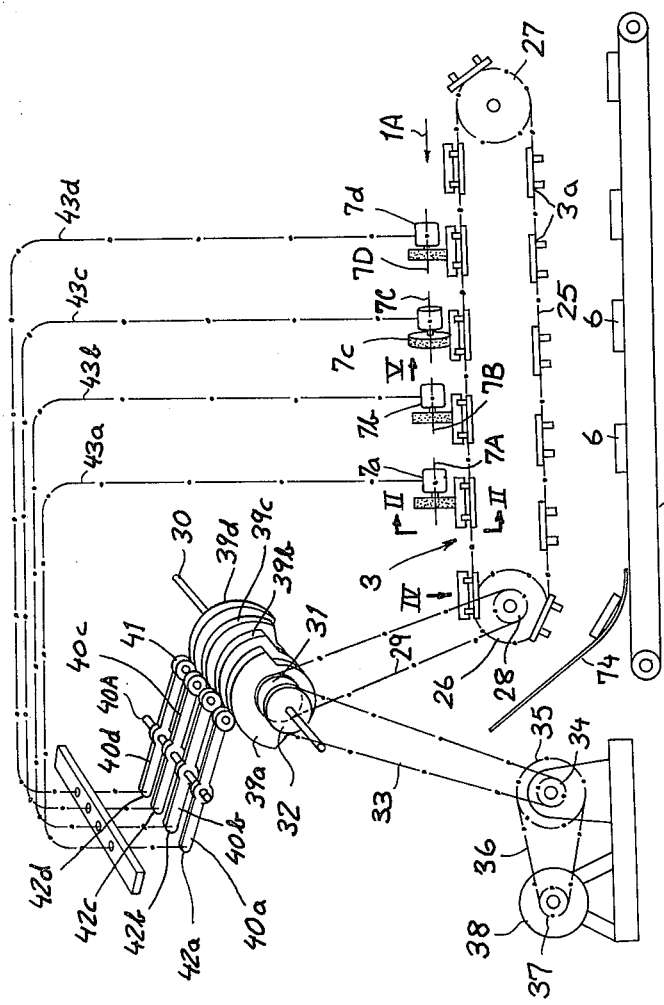
FIG. 1 is a largely schematic view of a system according to the present invention.

As shown in FIGS. 1 and 4 a plurality of workpieces 6 having their grain, that is the direction of stratification of their fibers, extending in direction 6A. These workpieces 6 are chair seats and are secured by means of clamps 5 of either mechanical or pneumatic type to individual dollies or carriages 3a moving along the guide rods 1 of a transport device 3. These rods 1 are carried on opposite sides of a central support 2 and are embraced snugly by the overhanging sides 4 of the carriages 3a as shown in FIGS. 2 and 3.

The carriages 3a are connected together in a train by chains 25 spanned between a drive sprocket 26 and an idler sprocket 27 so that they move in an upper stretch in a direction 1A which is perpendicular to the grain direction 6A. These workpieces 6 are fitted onto the carriages 3a at the upstream end of the path and drop off them at the downstream end onto a slide 74 which empties onto a conveyor 75 which carries them away.

The workpieces 6 are subdivided into four imaginary zones *a–d* which extend longitudinally and overlap slightly transversely. Each of these zones is shaped by a respective tool assembly 7*a*–7*d* as shown in FIGS. 1 and 4. These assemblies are spaced longitudinally along the conveyor 3 and are offset transversely to one another so that each assembly covers its zone as the workpiece passes under it.

FIG. 1 further shows how a plurality of cams 39 carried on a shaft 30 are each contacted by a respective cam follower 41 carried on a lever arm 40 pivoted about a fixed axis 40A. The shaft 30 carries a first sprocket wheel 31 connected via a chain 29 to a sprocket wheel 28 secured to the drive sprocket 26 for the conveyor 3. A second sprocket wheel 32 on the shaft 30 is connected via a chain 33 to the output sprocket 34 of a transmission 35 driven by a chain 36 passing over the sprocket pinion 37 of an electric drive motor 38. This motor 38 therefore turns the wheel 34 through the step-down transformer 35 and thence rotates the shaft 30 to rotate the cams 39a–39d and the sprocket 28 to advance the workpiece 6 in direction 1A. Each of the levers 40a–d has an end 42a–d which is connected via a respective bowden 43a–d to one of the assemblies 7a–7d so as to raise and lower this assembly according to the shape of the respective cam. Thus the shape of the depression 6' in the chair seat 6 is determined largely by these cams.

Each of the tool assemblies 7a–7d has a respective tool 24a–24d which is rotatable about a respective axis 7A–7D which extends in line with the direction 1A. The axes 7A, 7B, and 7D are perfectly parallel to the direction 1A and the axis 7C is slightly inclined thereto. The tools 24a–d are rotated so that they have a peripheral speed $V_{peripheral}$ of 15 m/sec which is equal here to 150 times the speed of advance $V_{advance}$ of 0.1 m/sec. The axis 7C extends at an angle $\alpha$ equal to arctan $V_{advance}/V_{peripheral}$ (see FIG. 4). In this manner any scratches left by the tool 24c will be exactly in line with the grain direction 6A. Since $V_{peripheral} = 150\ V_{advance}$, the angle $\alpha$ equals approximately 0°23'. Thus even when the axes 7A, 7B, and 7D are in line with the direction 1A the scratches produced by the tools will only lie at an angle of less than half a degree to the grain direction 6a, an almost imperceptible difference.

FIGS. 2 and 3 show the assembly 7a in more detail, it being understood that the assemblies 7b and 7d are identical and the assembly 7c is substantially similar, as will be described below.

The apparatus has a frame 8 which is interconnected via a dovetail formation 10 with the top of a downwardly extending post 9. The dovetail 10 extends perpendicularly to the direction 1A so that the post may be secured in a fashion to allow the respective tool 24a to engage its zone a, a clamping screw 11 serving to secure the post 9 in place.

The lower end of the post 9 is provided with a pair of vertically spaced parallel horizontal pivots 12 and 13 from which extend respective pairs of parallel arms 14 and 15 terminating at respective vertically spaced pivots 17 and 18 on the housing 16 of the tool 24a. Thus this housing for tool 24a is vertically displaceable but otherwise always assumes the same attitude relative to the arm 9. The bowden 43a has its sheath 43a' secured to a tab 76 on the post 9 and the end of its cable 43a'' secured to a screw 77 on the upper arm 14 about a third of the way from the pivot 12 toward the pivot 17. Thus the bowden 43a (FIG. 1) will control the vertical displacement of the tool assembly 7a.

The tool 24a itself is formed of a hollow rubber 24a' over which is secured an endless sanding belt 24a''. The disk 24a' has a wall thickness of 0.1 mm to 2.0 mm and is inflated with 1 atm. to 1.5 atm. gauge, as described in the commonly owned U.S. Pat. No. 3,496,685. This type of tool readily assumes the desired contours for an even sanding. It is carried on a shaft 23 defining the axis 7A and extending from the housing 16. A bevel gear 20 on the shaft 23 meshes in the housing with a bevel gear 19 rotated about an axis 19A which extends horizontally at a right angle to the axis 7A. The gear 19 is driven by a flexible cable 21 connected to the vertical output shaft of a motor 22 secured on the post 9. Since the conveyor 3 and cams 39a–39d are all positively linked together, the succession of workpieces 6 will be exactly shaped.

The tool assembly 7c is essentially identical to the assemblies 7a, 7b, and 7d, except that the housing 16' is limitedly pivotal about a vertical axis 7C' on a bracket 16a' carrying the pivots 17 and 18. Screws 78 can lock the two elements 16' and 16a' in the desired angular position relative to each other, and the drive cable 21' comes in through the top of the housing 16' and through the bracket 16a' at the axis 7C' to insure a good gear mesh regardless of the angular position of the housing 16'. This type of arrangement can be substituted for any of the arrangements as shown in FIGS. 2 and 3 so as to allow the tool axes to be slightly inclined to the grain direction.

Figures 6, 7:
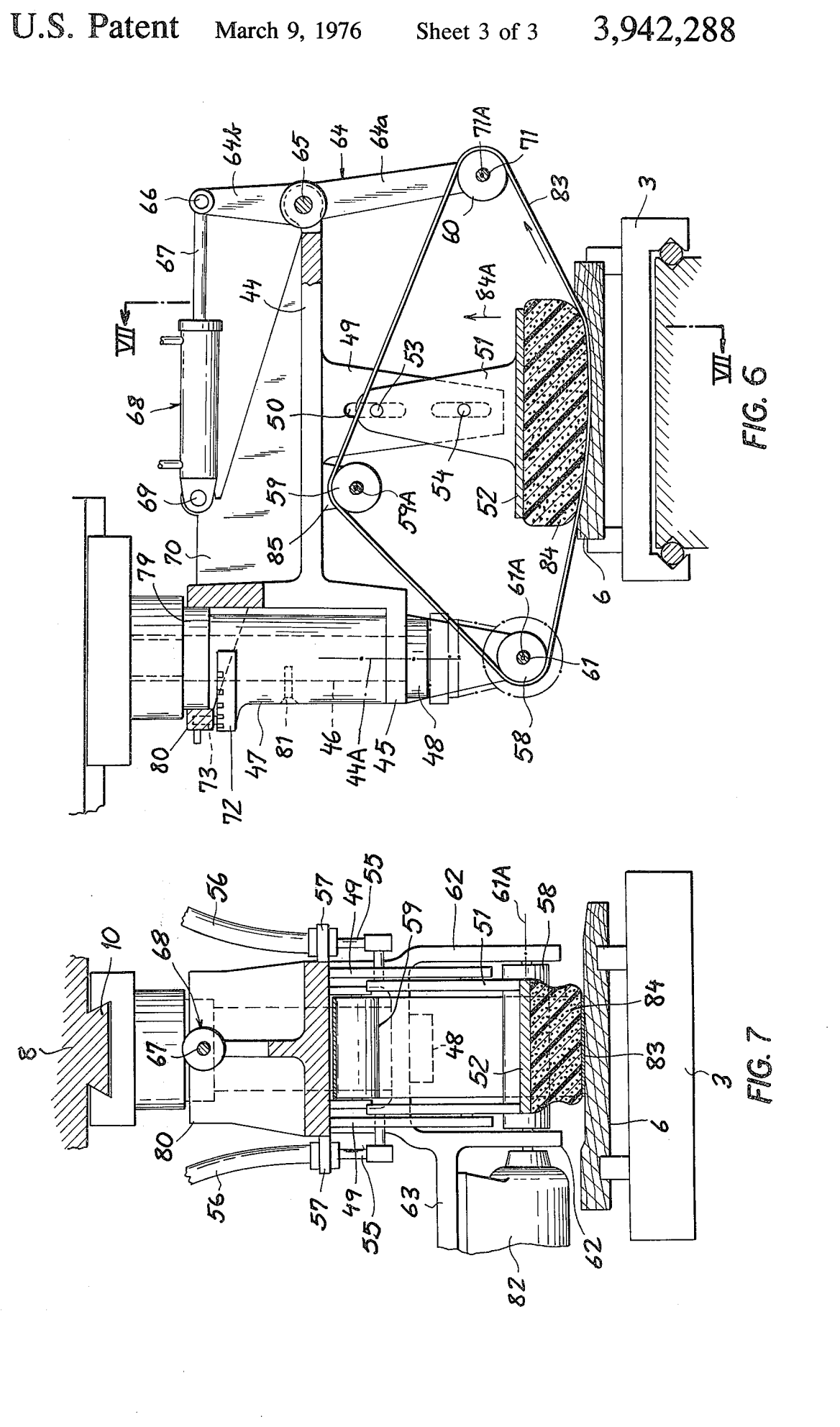

FIGS. 6 and 7 show an arrangement which can take the place of the arrangement of FIGS. 2, 3, and 5. Depending from the dovetail 10 on the support 8 is a vertical rod 46 provided with a collar 47 and a head 48. A radially extending support arm 44 has an upper eye 80 surrounding the upper region 79 of the collar 47 and a lower eye 45 between the head 48 and the collar 47. A screw 81 secures the collar 47 nonrotatably on the bolt 46. Thus this arm 44 is pivotal about a vertical axis 44A. The angular position of the arm 44 on the rod 46 is determined by a raisable spring-loaded pin 73 which engages in notches formed on a lip 72 on the collar 47. The pin 73 is lifted as the arm is rotated into the desired position, and then dropped into the appropriate notch of the ledge 72.

Depending from eye 45 are two parallel ears 62 between which extend a drive roll 58 carried on a drive shaft 61 journaled in these ears 62 and driven by a motor 82 carried on a flange 63 extending laterally from one of the ears 62. Two downwardly extending lugs 85 on the arm 44 journal an idler roller 59 rotatable about an axis 59A parallel to the rotation axis 61A of the roller 58.

The free end of the arm 44 carries a pivot 65 for a pair of two-arm levers 64 having lower arms 64a between which another idler roller 60 is rotatable on an axle 71 defining another horizontal axis 71A parallel to axes 59A and 58A. The upper ends 64b of arms 64 are urged inwardly, toward the rod 46, by a double-acting pneumatic cylinder pivoted at one end at 69 on a flange 70 formed on the arm 44 and having a piston rod 67 pivoted at 66 between the free ends of arms 64b.

Depending from the arm 44 are two parallel arms 49 each formed with two vertically elongated and vertically aligned slots 50. A large foam-rubber or foam synthetic-resin cushion 84 is carried on a plate 52 having a pair of upwardly extending arms 51 each extending up alongside a respective downwardly extending arm 49. A pair of vertically spaced and parallel horizontal rods 53 and 54 secured in the uprights 51 project into the slots 50 and allow the cushion to reciprocate vertically as shown by the arrow 84A.

The outer sheathes 56 of each of a pair of bowden cables are each attached to respective lug 57 on the arm 44 and the cables 55 of these bowdens are connected to the upper pins 53. The two bowdens 55, 56 are actuated together by a single cam according to an arrangement as shown in FIG. 1.

An endless sanding belt 83 is spanned over the rollers 58, 59, and 60, and over the cushion 84. This cushion 84 is urged against the workpieces 6 like the tools 24a–24d of FIG. 1 and the belt 83 is advanced in a direction parallel to the arm 44, which is set to be perpendicular to the transport direction 1A or slightly offset therefrom like the axis 7C. The cushion 83 can be contoured to have the exact shape of the seat depression to be formed.

The arrangement of FIGS. 6 and 7 can be used in addition to or in place of any of the tool assemblies 7a–7d of FIGS. 1–5.

I claim:

1. An apparatus for finishing generally flat contoured workpieces such as chair seats comprising:

conveyor means for displacing a succession of said workpieces in a transport direction at a uniform transport speed past a succession of finishing stations and including a plurality of holding means each for clamping a respective workpiece with the grain direction thereof substantially perpendicular to said transport direction; a succession of tools each at a respective station and each having a respective support wheel rotatable about an axis generally parallel to said transport direction and having an inwardly deflectable periphery carrying an abrasive surface having a width perpendicular to said transport direction and engageable with a respective zone of the respective workpiece narrower than the width of said workpieces transverse to said transport direction, the axes of said tools being parallel and the regions of attack of each surface upon said workpiece being offset from each other transverse to said transport direction with adjacent regions overlapping; and means for displacing each surface in a direction generally perpendicular to said transport direction at a speed equal to between 100 and 200 times greater than the travel speed of said workpiece, each tool including a support displaceable toward and away from said workpiece and a sandpaper belt spanned over each support, said belt having said abrasive surface, means for displacing said support toward and away from said workpiece according to a predetermined program, said means for displacing said support including a rotatable cam, a cam follower engaging said cam, and force-transmitting means between said follower and said support.

2. The apparatus defined in claim 1 wherein said conveyor means includes an endless conveyor carrying said holding means.

3. The apparatus defined in claim 1, further comprising a drive motor and means positively connecting said motor to said conveyor and to said cam.

* * * * *